United States Patent
Sun et al.

(10) Patent No.: US 10,681,721 B2
(45) Date of Patent: Jun. 9, 2020

(54) METHOD OF SCHEDULING SUBFRAMES IN A MILLIMETER WAVE SYSTEM

(71) Applicant: Alcatel Lucent, Nozay (FR)

(72) Inventors: Fanglei Sun, Shanghai (CN); Tao Yang, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/067,274

(22) PCT Filed: Dec. 20, 2016

(86) PCT No.: PCT/IB2016/001903
§ 371 (c)(1),
(2) Date: Jun. 29, 2018

(87) PCT Pub. No.: WO2017/115129
PCT Pub. Date: Jul. 6, 2017

(65) Prior Publication Data
US 2019/0029034 A1    Jan. 24, 2019

(30) Foreign Application Priority Data
Dec. 31, 2015  (CN) .......................... 2015 1 1029923

(51) Int. Cl.
*H04W 4/00* (2018.01)
*H04W 72/12* (2009.01)
(Continued)

(52) U.S. Cl.
CPC ....... *H04W 72/1289* (2013.01); *H04L 1/1812* (2013.01); *H04L 1/1861* (2013.01);
(Continued)

(58) Field of Classification Search
CPC ... H04L 1/1812; H04L 1/1861; H04L 5/0055; H04W 72/1289; H04W 88/08
See application file for complete search history.

(56) References Cited

U.S. PATENT DOCUMENTS

| 9,510,360 B2 * | 11/2016 | Rao ...................... H04L 1/0026 |
| 2013/0301490 A1 | 11/2013 | He et al. |

(Continued)

FOREIGN PATENT DOCUMENTS

| CN | 104285392 A | 1/2015 |
| CN | 105009474 A | 10/2015 |

(Continued)

OTHER PUBLICATIONS

Minseok Kim et al., "An implementation of Downlink Asynchronous HARQ for LTE TDD System," Radio and Wireless Symposium (RWS), IEEE pp. 271-274, XP032153350, 2012.

(Continued)

*Primary Examiner* — Minh Trang T Nguyen
(74) *Attorney, Agent, or Firm* — Fay Sharpe LLP

(57) ABSTRACT

The present disclosure provides a method for scheduling a subframe for transmitting data in a base station of a millimeter wave system, comprising: for scheduling a downlink subframe: transmitting a downlink scheduling signaling (DL grant) in a first subframe, wherein the downlink scheduling signaling includes at least one first scheduling position information, the first scheduling position information indicating a subframe position scheduled for performing downlink transmission; for scheduling an uplink subframe: transmitting an uplink scheduling signaling (UL grant) in a second subframe, wherein the uplink scheduling signaling includes at least one second scheduling position information, the second scheduling position information indicating a subframe position scheduled for performing uplink transmission. The present disclosure also provides a method for scheduling a subframe for transmitting HARQ-A/N in a millimeter wave system.

18 Claims, 3 Drawing Sheets

(51) Int. Cl.
  *H04L 1/18*  (2006.01)
  *H04L 5/00*  (2006.01)
  *H04L 5/14*  (2006.01)
  *H04W 88/08* (2009.01)

(52) U.S. Cl.
  CPC .......... *H04L 5/0055* (2013.01); *H04L 5/0092* (2013.01); *H04L 5/1469* (2013.01); *H04L 5/0023* (2013.01); *H04W 88/08* (2013.01)

(56) References Cited

U.S. PATENT DOCUMENTS

| | | | | |
|---|---|---|---|---|
| 2014/0016519 A1* | 1/2014 | Kim | ................... | H04W 72/1263 370/280 |
| 2014/0198696 A1* | 7/2014 | Li | ..................... | H04W 52/0229 370/311 |
| 2015/0085711 A1* | 3/2015 | Wang | ................... | H04L 5/14 370/280 |
| 2015/0201368 A1* | 7/2015 | Cudak | ................... | H04W 48/12 370/329 |
| 2015/0263829 A1 | 9/2015 | Nguyen et al. | | |
| 2016/0007371 A1 | 1/2016 | Pietraski et al. | | |
| 2018/0176869 A1* | 6/2018 | Aryafar | ................ | H04W 76/10 |

FOREIGN PATENT DOCUMENTS

| | | |
|---|---|---|
| WO | WO 2014/061998 A1 | 4/2014 |
| WO | WO 2014/098542 A1 | 6/2014 |
| WO | WO 2015/005641 A1 | 1/2015 |
| WO | WO 2015/110317 A1 | 7/2015 |

OTHER PUBLICATIONS

International Search Report for PCT/IB2016/001903 dated Apr. 6, 2017.

* cited by examiner

METHOD OF SCHEDULING SUBFRAMES IN A MILLIMETER WAVE SYSTEM

FIELD

Embodiments of the present disclosure relate to the field of wireless communications, and more specifically relate to a method of scheduling a subframe for transmitting data in a millimeter wave system, and a method of scheduling a subframe for transmitting HARQ-A/N.

BACKGROUND

A 5G physical layer aims to provide high performance data rate and reduced cost and power consumption. Massive MIMO, high frequency bands and dense deployment of small cells are expected to be main techniques to meet high capacity requirements of 5G. Besides, system scalability, flexibility of keeping UL and DL capacity, and optimized usage of unpaired spectrum are very important for 5G concept. Moreover, in addition to traditional UE-eNB access, more and more new various communication links are emerging such as self-backhauling by means of eNB-eNB communication and device-to-device communication without infrastructure, etc.

Based on these requirements of 5G, it is envisioned that the TDD mode has significant advantages for future 5G solutions, considering its cost-effectiveness as well as the possibility of exploiting large unpaired frequency bands. Use of the TDD model also allows exploiting channel reciprocity between UL and DL for reducing the feedback overhead, which is very beneficial for massive MIMO techniques requiring extensive channel state information.

However, in the current LTE/LTE-Advanced systems from Release 8 to Release 12, FDD operation is a dominating duplex mode compared to the TDD mode although both operations are supported. The TDD mode has been greatly harmonized to the FDD mode and the degree of TDD-specific optimization has been minimized. Specially, the design of subframe structure is optimized to FDD rather than TDD. With the conventional FDD-optimized subframe structure in use, in the TDD mode, the duration of any hand-shaking procedures between UE and eNB such as the initial data scheduling and the round trip time (RTT) of HARQ process is extended and highly dependent on the UL/DL ratio. This cannot achieve the ambitious RTT requirement (1 ms) of future 5G technology.

SUMMARY

In view of the above, a first aspect of the present disclosure provides a method for scheduling a subframe for transmitting data in a base station end of a millimeter wave system, comprising: for scheduling a downlink subframe: transmitting a downlink scheduling signaling (DL grant) in a first subframe, wherein the downlink scheduling signaling includes at least one first scheduling position information, the first scheduling position information indicating a position of a subframe scheduled for performing downlink transmission; for scheduling an uplink subframe: transmitting an uplink scheduling signaling (UL grant) in a second subframe, wherein the uplink scheduling signaling includes at least one second scheduling position information, the second scheduling position information indicating a position of a subframe scheduled for performing uplink transmission.

In one embodiment, when the at least one first scheduling position information is default or a specific value, the subframe performing downlink transmission is the first subframe, or the subframe performing downlink transmission is at least one first predetermined position after the first subframe; when the at least one second scheduling position information is default or a specific value, the subframe performing uplink transmission is the second subframe, or the subframe performing uplink transmission is at at least one second predetermined position after the second subframe.

In one embodiment, the at least one first predetermined position and/or the at least one second predetermined position are agreed in advance.

In one embodiment, the at least one first predetermined position and/or the at least one second predetermined position are periodically determined by the base station and notified to a user through a high-level signaling or a L1 signaling.

In one embodiment, a high level pre-defines a plurality of schemes for the at least one first predetermined position and/or the at least one second predetermined position, and the base station periodically notifies an identifier of the selected scheme to a user through a physical layer.

In one embodiment, the downlink scheduling signaling and/or the uplink scheduling signaling are transmitted to a user through a physical downlink control channel or a physical downlink data channel.

In one embodiment, the downlink scheduling signaling further comprises at least one HARQ identifier, each HARQ identifier corresponding to a scheduled subframe; the uplink scheduling signaling further comprises at least one HARQ identifier, each HARQ identifier corresponding to a scheduled subframe.

In one embodiment, the transmitted data are retransmitted data.

A second aspect of the present disclosure provides a method for scheduling a subframe for transmitting HARQ-A/N in a millimeter wave system, comprising: determining a third scheduling position information, wherein the third scheduling position information is used for indicating a position of a subframe scheduled for transmitting HARQ-A/N, and the HARQ-A/N is used for indicating whether the data transmitted on a third subframe is successful.

In one embodiment, when the third scheduling position information is default or a specific value, the subframe for transmitting HARQ-A/N is the third subframe, or the subframe for transmitting HARQ-A/N is at a third predetermined position after the third subframe.

In one embodiment, when the third scheduling position information is determined by the base station, the third predetermined position is pre-determined or periodically determined by the base station, and is notified to a user through a high-level signaling or a L1 signaling; or the high level predefines a plurality of schemes for the third predetermined position; the base station periodically notifies an identifier of the selected scheme to the user via the physical layer.

In one embodiment, the third scheduling position information determined for respective users in the specific cell is identical.

In one embodiment, the third scheduling position information determined for respective users in the specific cell is different.

In one embodiment, the position of the subframe scheduled for transmitting HARQ-A/N is instantly determined according to a state of the HARQ process. The method further comprises steps of: assigning a HARQ identifier to each HARQ; embedding the HARQ identifier into the HARQ-A/N to transmit together when transmitting the HARQ-A/N.

In one embodiment, when the third scheduling position information is determined by a receiver of the HARQ process, the method further comprises a step of assigning a HARQ identifier for each HARQ; embedding an identifier of the user and/or a corresponding HARQ identifier in the HARQ-A/N; transmitting the HARQ-A/N to a transmitter within a predetermined subframe window range, wherein the position of the subframe scheduled to transmit the HARQ-A/N is within the subframe window range.

BRIEF DESCRIPTION OF THE DRAWINGS

Through reading detailed depiction of the non-limiting embodiments with reference to the accompanying drawings, other features, objectives and advantages of the present disclosure will become more apparent.

DETAILED DESCRIPTION OF EMBODIMENTS

In the detailed depiction of the preferred embodiments, accompanying drawings that constitute a part of the present disclosure will be referenced. The exemplary accompanying drawings illustrate specific embodiments that can implement the present disclosure. The exemplary embodiments are not intended to exhaust all embodiments of the present disclosure. It may be understood that without departing from the scope of the present disclosure, other embodiments may be employed, or structural or logical modifications may be made. Therefore, the specific depiction infra is not limitative, and the scope of the present disclosure is limited by the appending claims. In addition, although the specification depicts steps of the method in a specific sequence, this does not require or imply that these operations have to be executed in the specific sequence or a desired result can only be achieved after all of the illustrated operations are completely executed. On the contrary, execution sequences of the depicted steps may be changed. Additionally or alternatively, some steps may be omitted, a plurality of steps may be combined into one step to execute, and/or one step may be decomposed into a plurality of steps for execution.

Based on the known advantages of the TDD mode in conjunction with FDD, we have proposed two types of specific TDD subframe structure design. Based on the two types of subframe structures (not limited to the two types of subframe structures), we have proposed methods for subframe scheduling for uplink and downlink transmission, for subframe scheduling for transmitting HARQ, and for subframe scheduling for re-transmission. These solutions are essential for meeting high demands of 5G.

We will first introduce frame structures possibly used in 5G. In 5G, design of the frame structure tends to provide a shorter delay but a better flexibility.

Figure 1:
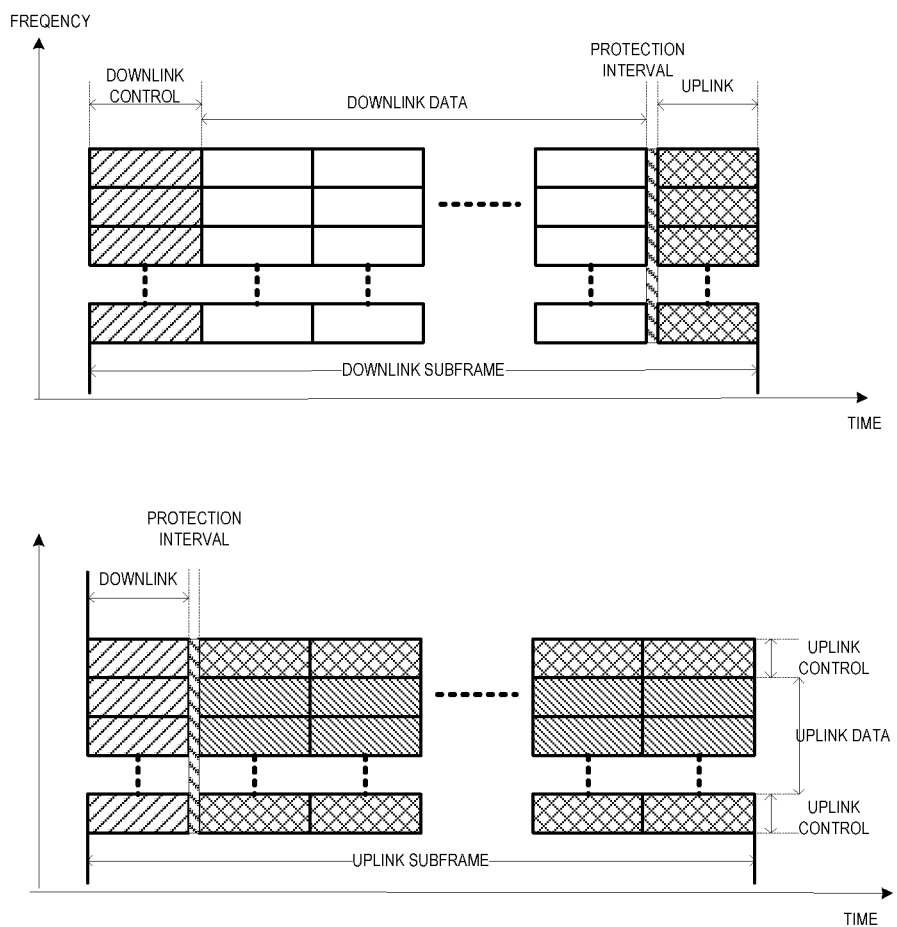
FIG. 1 illustrates a frame structure in a millimeter wave system.

FIG. 1 illustrates a frame structure in a millimeter wave system. The frame comprises a downlink subframe and an uplink subframe. An uplink control area and a downlink control area are embedded in the downlink subframe or an uplink subframe, respectively. Therefore, HARQ feedback may be transmitted in a same subframe or has a shorter round-trip transmission time period.

Figure 2:
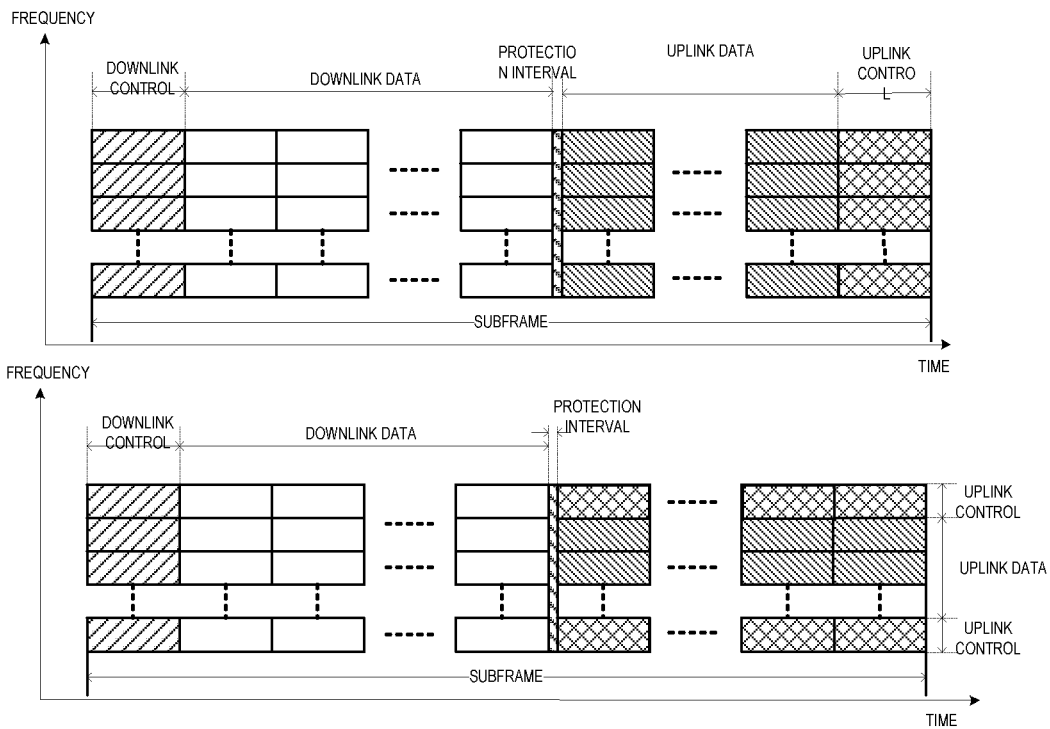
FIG. 2 illustrates another frame structure in a millimeter wave system.

FIG. 2 illustrates a frame structure in another millimeter wave system. The frame comprises one or more of downlink control, downlink data, uplink control, and uplink data area. FIG. 2 illustrates two frames structures where PUCCH are located at different positions.

Besides, the prior art has frames of other structures. However, for these frames, schemes for invoking these subframes to perform data transmission, HARQ-A/N transmission, and data retransmission are absent. To this end, we propose the following schemes:

1. Scheme of Scheduling a Subframe to Perform Data Transmission

1) Subframe Scheduling for Downlink Data Transmission

Figure 3:
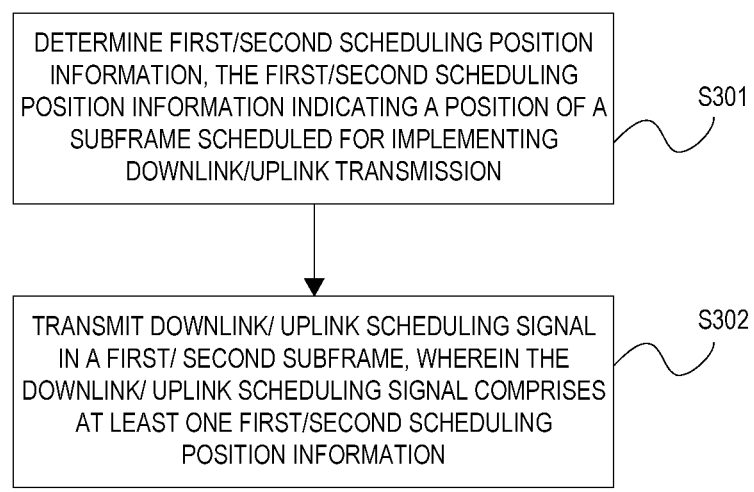
FIG. 3 illustrates a flow diagram of a method for scheduling a subframe for transmitting data in a base station of a millimeter wave system according to one embodiment of the present disclosure.

In the millimeter wave system, scheduling of uplink and downlink subframes is still controlled by the base station. Suppose a downlink scheduling signaling (DL grant) is transmitted in subframe n, and data will be transmitted in at least one scheduled subframe $n+k_m$, m=1, . . . , M. Refer to the flow diagram of the method illustrated in FIG. 3, this scheme includes:

In step S301, determining first scheduling position information, the first scheduling position information indicating a position of a subframe scheduled for performing downlink transmission, i.e., the position of subframe $n+k_m$.

In step S302, transmitting downlink scheduling signaling in a first subframe (i.e., subframe n), wherein the downlink scheduling signaling comprises at least one first scheduling position information. Particularly, the downlink scheduling signaling may be transmitted to the user through a physical downlink control channel or a physical downlink data channel.

a. When the downlink scheduling signaling only comprises one first scheduling position information, the scheduling is a single subframe scheduling, i.e., in the downlink scheduling signaling of one subframe, only one subframe performing downlink transmission is scheduled.

In the single-subframe scheduling, the position may be represented through a value $k_m$ of the one first scheduling position information. For example, when the value is 3, it may represent that the position of the subframe for performing downlink transmission is the third subframe after the subframe n transmitting the downlink scheduling signaling.

In one specific embodiment, when the value is default or the value is a specific value (e.g., 0), it indicates that the subframe scheduled for performing downlink transmission is the subframe n transmitting a downlink scheduling signaling.

In another specific embodiment, when the value is default or the value is a specific value, it indicates that the subframe performing downlink transmission is at a first predetermined position after subframe n transmitting the downlink scheduling signaling, e.g., the second subframe after the subframe n. The predetermined position may be pre-agreed and fixed, or periodically determined by the base station and notified to the user through high-level signaling or L1 signaling.

In one embodiment, the high level pre-defines a plurality of schemes of configuring the first predetermined position (e.g., scheme 1: the first predetermined position is the $2^{nd}$ position after the subframe n; scheme 2: the first predetermined position is the $3^{rd}$ position after the subframe n); each scheme has a corresponding identifier; when it needs to notify the user which scheme is used, the base station only needs to notify the user of the selected scheme through the physical layer.

b. When the downlink scheduling signaling comprises a plurality of first scheduling position information, the scheduling is a multi-subframe scheduling, i.e., scheduling a plurality of subframes for performing downlink transmission in a downlink scheduling signaling of one subframe.

In multi-subframe scheduling, the position may be represented by values $k_m$, m=1, . . . , M of a plurality of first scheduling position information. For example, when $k_1$ is 3, and $k_2$ is 4, it may represent that the positions of subframes for downlink transmission are the $3^{rd}$ subframe and the $4^{th}$ subframe after the subframe n transmitting the downlink scheduling signaling.

In one specific embodiment, when the value is default or the value is a specific value (e.g., 0), it represents that the subframe scheduled for performing downlink transmission is the subframe n transmitting a downlink scheduling signaling.

In another specific embodiment, when the value is default or the value is a specific value, it represents that the subframes performing downlink transmission are at a plurality of first predetermined positions after the subframe transmitting the downlink scheduling signaling. For example, if the predetermined positions are 3, 4, 5, then when the value of $k_m$ is default, it represents that the positions of the subframes for performing downlink transmission are the $3^{rd}$, $4^{th}$, and $5^{th}$ subframes after subframe n transmitting the downlink scheduling signaling. The predetermined position is pre-agreed and fixed, or periodically determined by the base station and notified to the user through the high-level signaling or L1 signaling.

In one embodiment, the high level predefines a plurality of schemes of configuring the plurality of first predetermined positions (e.g., scheme 1: a plurality of first predetermined positions are $2^{nd}$ and $3^{rd}$ subframes after the subframe n; scheme 2: a plurality of first predetermined positions are $3^{rd}$ and $4^{th}$ subframes after the subframe n); each scheme has a corresponding identifier; when it needs to notify the user of which scheme is used, the base station needs only notifying the identifier of the selected scheme to the user end through the physical layer.

During multi-subframe scheduling, because the subframe for scheduling does not one-to-one correspond to the subframe for performing data transmission, when a data recipient transmits an HARQ (hybrid automatic repeat request) acknowledgement, the sender cannot confirm to which subframe the acknowledgement corresponds.

To this end, in this scheme, a HARQ identifier is assigned to each scheduled subframe; when it needs to transmit an HARQ acknowledgement to the sender, the identifier may be embedded in the HARQ-ACK/NACK (where HARQ-ACK indicates a successful transmission, while HARQ-NACK indicates a failed transmission, hereinafter referred to as HARQ-A/N), such that the sender knows to which subframe the HARQ-A/N corresponds. Particularly, an identifier of the user end may also be embedded in the HARQ-A/N so as to facilitate identifying to which user the HARQ-A/N corresponds.

As mentioned above, when the $k_m$ value is default, the predetermined position is pre-agreed and fixed, or periodically determined by the base station. Because the predetermined position is determined at this point, the HARQ identifier might not be embedded in the HARQ-A/N, and the HARQ identifier might also be default.

2) Scheduling a Subframe for Uplink Data Transmission

The scheme of scheduling a subframe for uplink data transmission is similar to the scheme of scheduling a subframe for downlink data transmission. Also refer to FIG. 3. It is assumed that the uplink scheduling signaling (UL grant) is transmitted in the subframe n, and the scheduled data will be transmitted in at least one subframe $n+k_m$, m=1, . . . , M. This scheme comprises:

step S301: determining second scheduling position information. The second scheduling position information indicating a position of a subframe scheduled for performing uplink transmission, i.e., the position of subframe $n+k_m$.

step S302: transmitting uplink scheduling signaling in a second subframe (i.e., subframe n), wherein the uplink scheduling signaling includes at least one second scheduling position information. Particularly, the uplink scheduling signaling may be transmitted to a user through a physical downlink control channel or a physical downlink data channel.

Likewise, subframe scheduling for uplink data transmission also includes single-subframe scheduling and multi-subframe scheduling; and a HARQ identifier may also be assigned to each scheduled uplink subframe. Therefore, preferred embodiments of subframe scheduling for downlink data transmission may also be applicable to subframe scheduling for uplink data transmission, which will not be detailed here.

2. Scheme of Scheduling a Subframe for Performing HARQ-A/N Transmission

1) Determine, by a Base Station, a Subframe for Transmitting HARQ-A/N

The present invention provides two schemes for scheduling a subframe to perform HARQ-A/N transmission. The first scheme is to determine, by a base station, a subframe for transmitting HARQ-A/N.

Figure 4:
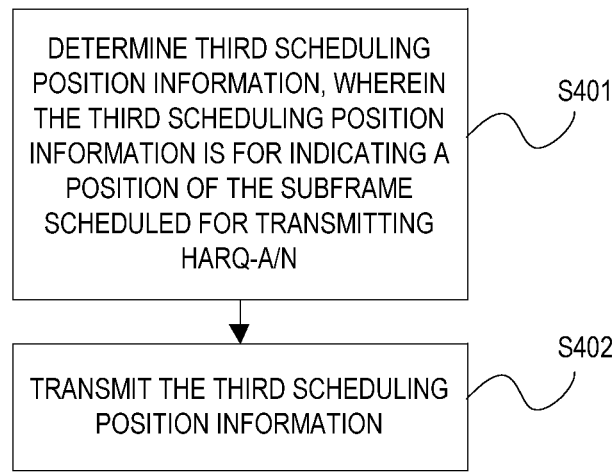
FIG. 4 illustrates a flow diagram of a method for scheduling a subframe for transmitting HARQ-A/N in a millimeter wave system according to one embodiment of the present disclosure.

It is assumed that data are transmitted in subframe n, and the HARQ-A/N indicating whether data are successfully transmitted on the subframe n will be transmitted in the to-be-scheduled subframe $n+k_l$. Refer to the flow diagram of the method of FIG. 4, this scheme comprises:

Step S401: determining, by a base station, third scheduling position information, wherein the third scheduling position information is for indicating a position of the subframe scheduled for transmitting HARQ-A/N, e.g., indicating that the $k_l^{th}$ subframe $n+k_l$ after the subframe n is the subframe scheduled for transmitting the HARQ-A/N.

Step S402: transmitting the third scheduling position information to a user through downlink scheduling signaling or uplink scheduling signaling. For example, for HARQ-A/N of downlink data transmission, the third scheduling position information is embedded in the downlink scheduling signaling; for HARQ-A/N of uplink data transmission, the third scheduling position information is embedded in uplink scheduling signaling.

In one preferred embodiment, same third scheduling position information may be set for users within the same cell. In other words, the positions spaced between the subframe n for data transmission and the subframe $n+k_l$ for HARQ-A/N transmission in all users within the cell are set to identical. However, in another preferred embodiment, different third scheduling position information may also be set for users within the same cell. In other words, the positions spaced between the subframe n for data transmission and the subframe n+k$_j$ for HARQ-A/N transmission in all users within the cell might be different.

In one preferred embodiment, when the value of third scheduling position information is default or the value is a specific value (e.g., 0), it indicates that the subframe scheduled for transmitting the HARQ-A/N is the subframe n performing data transmission.

In another preferred embodiment, when the value is default or the value is a specific value, it indicates that the subframe n for HARQ-A/N transmission is on the third predetermined position after the subframe n for data transmission, e.g., the fourth subframe after the subframe n. The predetermined position may be pre-agreed and fixed, or periodically determined by the base station and notified to the user through high-level signaling or L1 signaling.

In one embodiment, the high level predefines a plurality of schemes for configuring the third predetermined position (e.g., scheme 1: the third predetermined position is the $2^{nd}$ subframe after the subframe n; scheme 2: the third predetermined position is the $3^{rd}$ subframe after subframe n); each scheme has a corresponding identifier; when it needs to notify the user end of using which scheme, the base station needs only notifying the user end of the identifier of the selected scheme through the physical layer.

In another preferred embodiment, the position of the subframe scheduled for transmitting HARQ-A/N is instantly determined based on the state of the HARQ process. The scheme also comprises assigning a HARQ identifier to each HARQ; when transmitting the HARQ-A/N, the HARQ identifier and/or user identifier are embedded into the HARQ-A/N to be transmitted together. In this way, the transmitter knows to which subframe of which user the HARQ-A/N corresponds.

2) Determine, by a Data Recipient, a Subframe for HARQ-A/N Transmission

The second scheme provided by the present invention is to determine, by the data recipient (i.e., the recipient of the HARQ process), a subframe for transmitting HARQ-A/N. For example, if the data are transmitted from the base station to the user, then the user will determine which subframes are scheduled to transmit HARQ-A/N. Because the HARQ-A/N is transmitted by the data recipient, this scheme is more advantageous for the party transmitting the HARQ-A/N to reasonably schedule the subframe resources.

Figure 5:
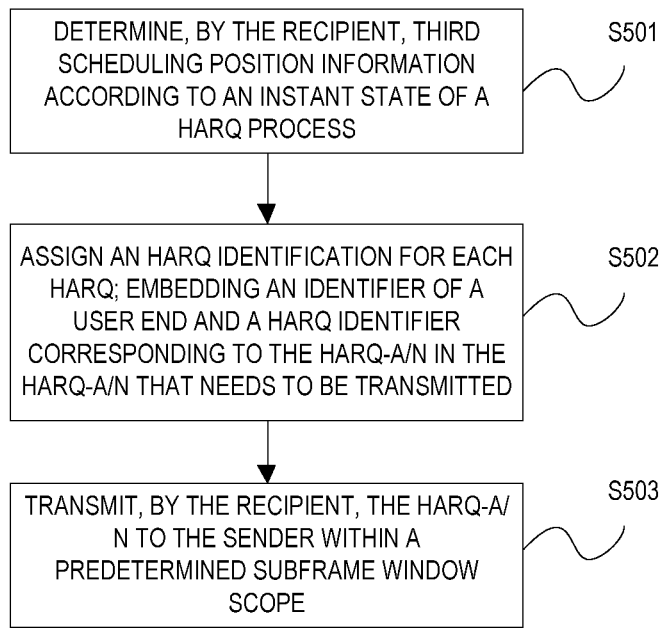
FIG. 5 illustrates a flow diagram of a method for scheduling a subframe for transmitting HARQ-A/N in a millimeter wave system according to another embodiment of the present disclosure.

Likewise, it is assumed that the data are transmitted in the subframe n, and the HARQ-A/N indicating whether the data are successfully transmitted on the subframe n will be transmitted in the scheduled subframe n+k$_j$. Refer to the method flow diagram illustrated in FIG. 5, this scheme comprises:

In step S501, the recipient determines third scheduling position information according to an instant state of a HARQ process, wherein the third scheduling position information is for indicating a position of a subframe scheduled for transmitting HARQ-A/N, e.g., indicating that the k$_j$th subframe n+k$_j$ after the subframe n is a subframe scheduled for transmitting HARQ-A/N.

In step S502, assigning an HARQ identification for each HARQ; embedding an identifier of a user and a HARQ identifier corresponding to the HARQ-A/N in the HARQ-A/N that needs to be transmitted. Particularly, adding of the user identifier is to prevent the plurality of recipients from simultaneously transmitting the HARQ-A/N with a consequence of being incapable of identifying that the HARQ-A/N is directed to data of which user.

In step S503, transmitting, by the recipient, the HARQ-A/N to the sender within a predetermined subframe window scope, wherein the position of the subframe scheduled for transmitting the HARQ-A/N is within the subframe window range.

3. Scheme of Scheduling the Subframe to Perform Retransmission

For scheduling of the retransmitted data, its implementation manner is identical to the scheme of scheduling the subframe to perform data transmission. The difference lies in that: in the scheme of scheduling a subframe to perform data transmission, what are transmitted are initially transmitted data, while in the present scheme, what are transmitted are retransmitted data. Therefore, the scheme for data retransmission in the present invention may be implemented with reference to the scheme of scheduling a subframe for data transmission. It will not be detailed here.

To those skilled in the art, it is apparent that the present invention is not limited to the details of the above exemplary embodiments, and the present invention is may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A method of scheduling a subframe for transmitting data at a base station of a millimeter wave system, comprising:
    for scheduling of a downlink subframe:
        transmitting a downlink scheduling signaling in a first subframe, wherein the downlink scheduling signaling includes at least one first scheduling position information, the first scheduling position information indicating a position of a subframe scheduled for performing downlink transmission;
    for scheduling of an uplink subframe:
        transmitting an uplink scheduling signaling in a second subframe, wherein the uplink scheduling signaling includes at least one second scheduling position information, the second scheduling position information indicating a position of a subframe scheduled for performing uplink transmission.

2. The method according to claim 1, wherein
    when the at least one first scheduling position information is default or a specific value, the subframe performing downlink transmission is the first subframe, or the subframe performing downlink transmission is at least one first predetermined position after the first subframe;
    when the at least one second scheduling position information is default or a specific value, the subframe performing uplink transmission is the second subframe, or the subframe performing uplink transmission is at least one second predetermined position after the second subframe.

3. The method according to claim 2, wherein the at least one first predetermined position and/or the at least one second predetermined position are agreed in advance.

4. The method according to claim 2, wherein the at least one first predetermined position and/or the at least one second predetermined position are periodically determined by the base station and notified to a user through a high-level signaling or a L1 signaling.

5. The method according to claim 2, wherein a high level pre-defines a plurality of schemes for the at least one first predetermined position and/or the at least one second predetermined position, and the base station periodically notifies an identifier of the selected scheme to a user through a physical layer.

6. The method according to claim 1, wherein the downlink scheduling signaling and/or the uplink scheduling signaling are transmitted to a user through a physical downlink control channel or a physical downlink data channel.

7. The method according to claim 1, wherein:
the downlink scheduling signaling further comprises at least one HARQ identifier, each HARQ identifier corresponding to a scheduled subframe;
the uplink scheduling signaling further comprises at least one HARQ identifier, each HARQ identifier corresponding to a scheduled subframe.

8. The method according to claim 1, wherein the transmitted data are retransmitted data.

9. A method for scheduling a subframe for transmitting HARQ-A/N in a millimeter wave system, comprising:
determining a third scheduling position information, the third scheduling position information indicating a position of a subframe scheduled for transmitting HARQ-A/N, and the HARQ-A/N indicating whether the data transmitted on a third subframe is successful.

10. The method according to claim 9, wherein when the third scheduling position information is default or a specific value, the subframe for transmitting HARQ-A/N is the third subframe, or the subframe for transmitting HARQ-A/N is at a third predetermined position after the third subframe.

11. The method according to claim 10, wherein when the third scheduling position information is determined by a base station,
the third predetermined position is pre-determined or periodically determined by the base station, and is notified to a user through a high-level signaling or a L1 signaling; or
the high level predefines a plurality of schemes for the third predetermined position;
the base station periodically notifies an identifier of the selected scheme to the user via the physical layer.

12. The method according to claim 11, wherein the third scheduling position information determined for respective users in the specific cell is identical.

13. The method according to claim 11, wherein the third scheduling position information determined for respective users in the specific cell is different.

14. The method according to claim 9, wherein the position of the subframe scheduled for transmitting HARQ-A/N is instantly determined according to a state of the HARQ process, the method further comprising:
assigning a HARQ identifier to each HARQ; and
embedding the HARQ identifier into the HARQ-A/N to transmit them together when transmitting the HARQ-A/N.

15. A method comprising:
determining a third scheduling position information, the third scheduling position information indicating a position of a subframe scheduled for transmitting HARQ-A/N, and the HARQ-A/N indicating whether the data transmitted on a third subframe is successful;
assigning a HARQ identifier for each HARQ;
embedding an identifier of the user and/or a corresponding HARQ identifier in the HARQ-A/N; and
transmitting the HARQ-A/N to a transmitter within a predetermined subframe window range, wherein the position of the subframe scheduled to transmit the HARQ-A/N is within the subframe window range.

16. An apparatus for scheduling a subframe for transmitting data at a base station of a millimeter wave system, comprising:
at least one processor; and
at least one memory including computer program code;
the at least one memory and the computer program code configured to, with the at least one processor, cause the apparatus at least to perform:
for scheduling of a downlink subframe:
transmitting a downlink scheduling signaling in a first subframe, wherein the downlink scheduling signaling includes at least one first scheduling position information, the first scheduling position information indicating a position of a subframe scheduled for performing downlink transmission;
for scheduling of an uplink subframe:
transmitting an uplink scheduling signaling in a second subframe, wherein the uplink scheduling signaling includes at least one second scheduling position information, the second scheduling position information indicating a position of a subframe scheduled for performing uplink transmission.

17. An apparatus for scheduling a subframe for transmitting HARQ-A/N in a millimeter wave system, comprising:
at least one processor; and
at least one memory including computer program code;
the at least one memory and the computer program code configured to, with the at least one processor, cause the apparatus at least to perform:
determining a third scheduling position information, the third scheduling position information indicating a position of a subframe scheduled for transmitting HARQ-A/N, and the HARQ-A/N indicating whether the data transmitted on a third subframe is successful.

18. A user equipment comprising:
at least one processor; and
at least one memory including computer program code;
the at least one memory and the computer program code configured to, with the at least one processor, cause the user equipment at least to perform:
determining a third scheduling position information, the third scheduling position information indicating a position of a subframe scheduled for transmitting HARQ-A/N, and the HARQ-A/N indicating whether the data transmitted on a third subframe is successful;
assigning a HARQ identifier for each HARQ;
embedding an identifier of the user and/or a corresponding HARQ identifier in the HARQ-A/N; and
transmitting the HARQ-A/N to a transmitter within a predetermined subframe window range, wherein the position of the subframe scheduled to transmit the HARQ-A/N is within the subframe window range.

* * * * *